Oct. 2, 1951 W. T. HANNA 2,569,812
TENDER CONVEYER SYSTEM FOR LOCOMOTIVE STOKERS
Filed Oct. 7, 1947 4 Sheets-Sheet 1
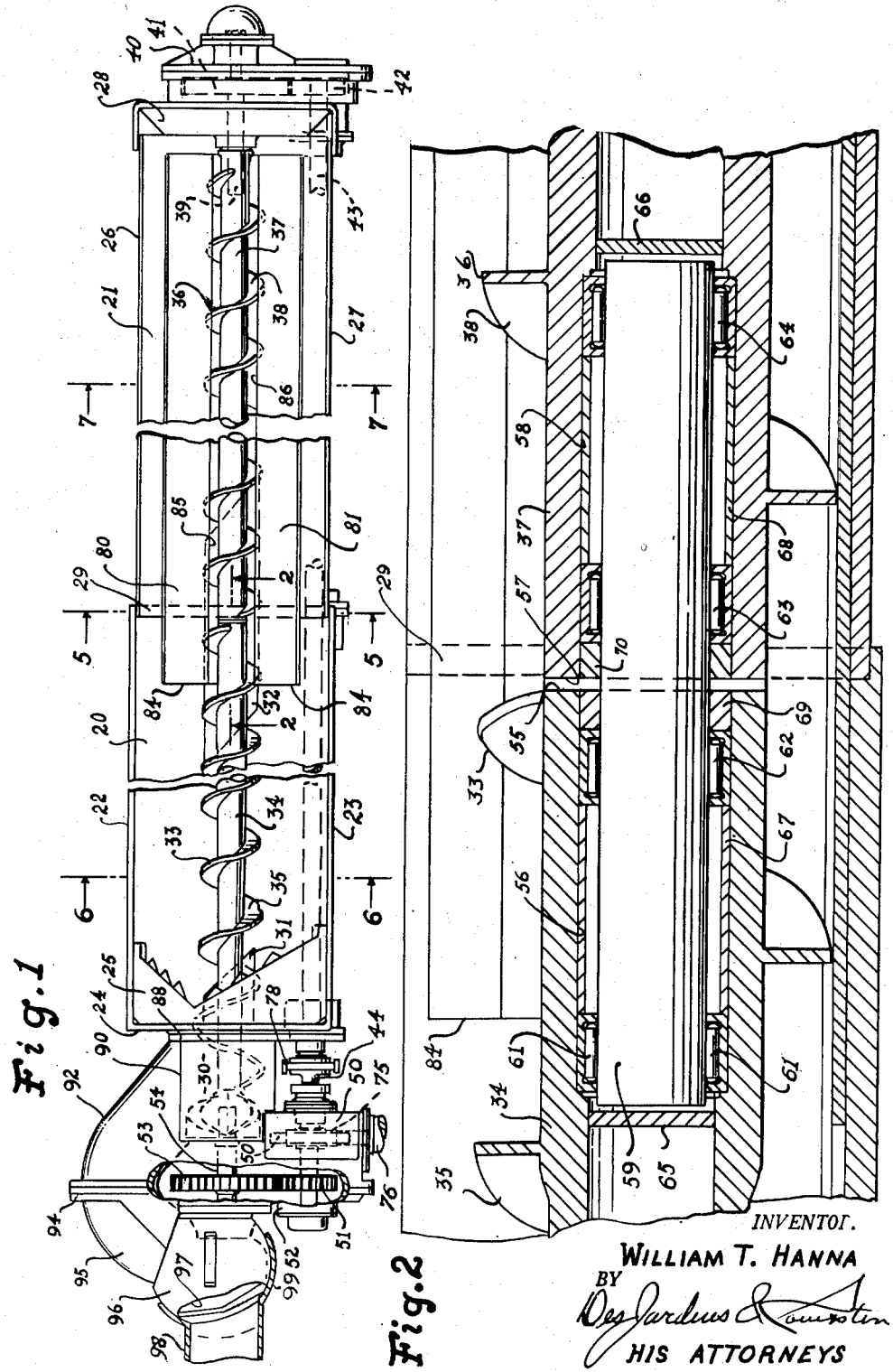
INVENTOR.
WILLIAM T. HANNA
BY
HIS ATTORNEYS

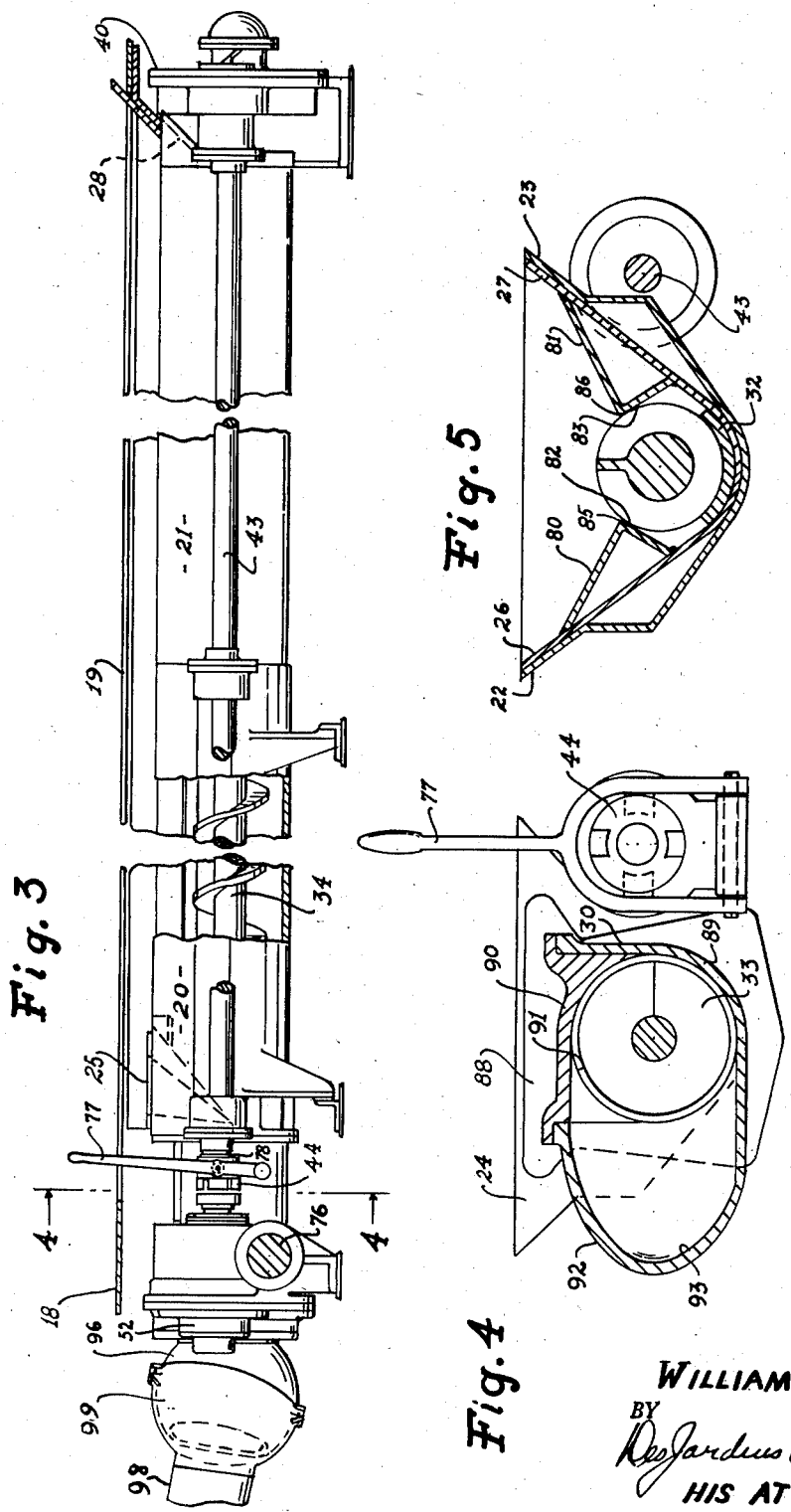

Oct. 2, 1951      W. T. HANNA      2,569,812
TENDER CONVEYER SYSTEM FOR LOCOMOTIVE STOKERS
Filed Oct. 7, 1947      4 Sheets-Sheet 3
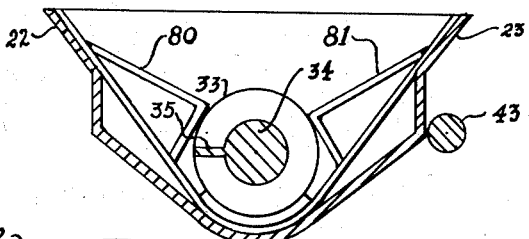
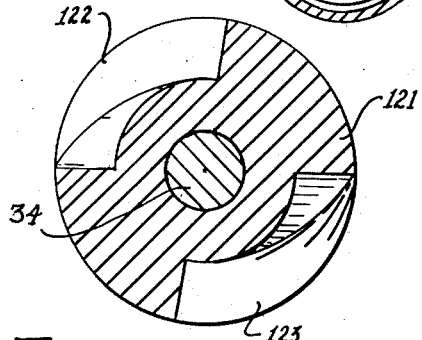
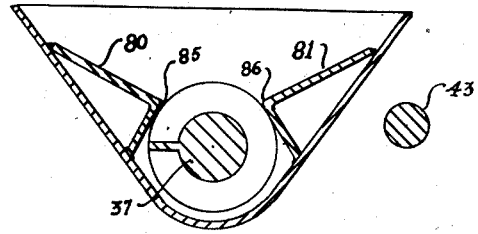
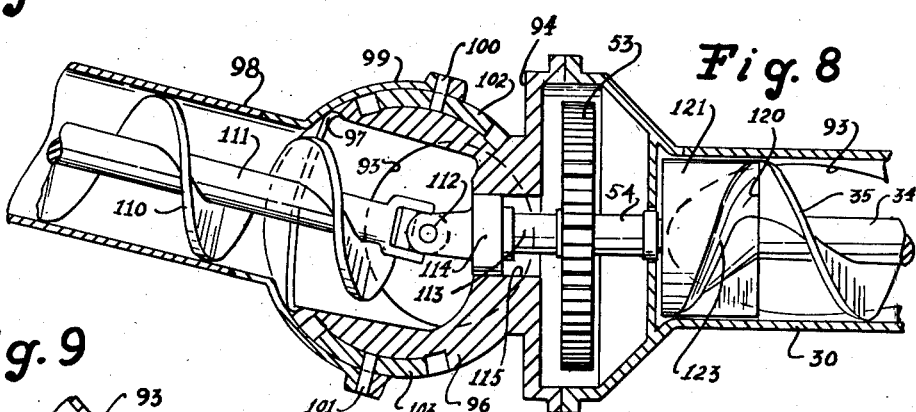
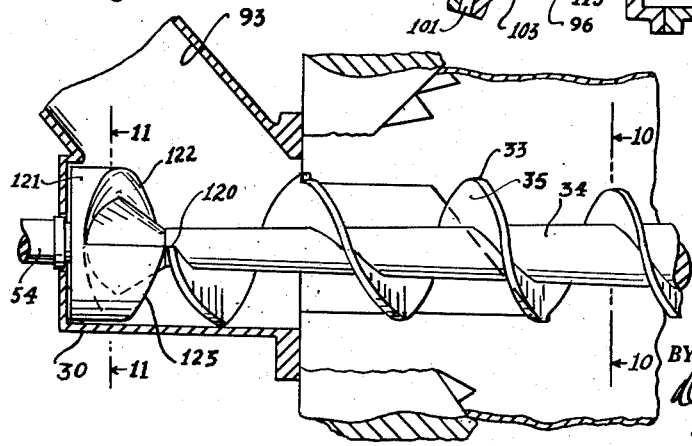
INVENTOR.
WILLIAM T. HANNA
BY
HIS ATTORNEYS Patented Oct. 2, 1951

2,569,812

UNITED STATES PATENT OFFICE 2,569,812

TENDER CONVEYER SYSTEM FOR LOCOMOTIVE STOKERS

William T. Hanna, Cincinnati, Ohio; Richard W. Todd executor of said William T. Hanna, deceased Application October 7, 1947, Serial No. 778,341

37 Claims. (Cl. 198—15)

This invention relates to a tender conveyor system for a locomotive stoker, and more particularly pertains to such a system adapted to serve an extra long tender by providing a long trough in which are rotatably mounted two fuel conveying screws in axial alignment.

It is not feasible to use a single long screw in fuel conveyors for locomotive tenders, because such a screw must be driven from one end and the increased length creates a condition where an excessive load is placed upon the screw, making it necessary to use excessively high driving torques and resulting in a distortion and failure of the screw. Moreover, an unusually long screw, being rotatable as a unit, is inefficient, because, at certain times, when the tender is fully loaded, it is desirable to have fuel conveyed only from the front end of the tender.

Various expedients have been tried to utilize two screws to serve long tenders, some of the devices being of the type wherein the screws are offset, one screw delivering fuel to another screw located in another trough which, in turn, passes it on toward the locomotive. The offsetting of such screws and troughs is undesirable because it takes up room, particularly in a vertical direction, renders difficult the installation and removal of parts, and necessitates special designs in the manufacture of the tender.

In a co-pending application Serial No. 774,199 for United States Letters Patent, filed by me on the 16th day of September 1947, I disclose the use of two short conveyors, each rear driven, placed in longitudinal alignment beneath the fuel deck of a long tender, wherein the fuel delivered from the rear one of the conveyors was passed by a conduit into the forward one of the conveyors. In that structure there were two coal troughs, two screws and two driving means, the troughs and screws being in axial alignment.

In the present structure I provide a single trough with two screws rotatably mounted therein, the rearmost of the screws being driven from the rear end and the foremost of the screws being driven from the forward end. Fuel delivered at the forward end of the trough is by-passed laterally around the driving means at the front end of the foremost screw by means of a novel lateral conduit. The screws abut in end to end relationship at the midpoint of the trough and are held in axial alignment by a floating dowel pin extending between the screw shafts. Special means are provided for holding the screws down in the trough at their dowel pin coupled ends, near the middle of the trough, in the form of special retaining plates fastened to the upper sides of the trough. I also provide a novel kind of conveyor screw, as the foremost screw, in which the forward end has a reversely flighted portion which cooperates with the normal fin flight and which serves to force the fuel sideways, at the front end of the trough, into a side conduit shaped to by-pass the front end driving means.

Therefore, it is an object of this invention to provide a tender conveyor system for a locomotive stoker, which conveyor system comprises a single trough containing two independently rotatable screws held in axial alignment.

Another object of the invention is to provide such a tender conveyor system in which the rearmost screw is driven from the rear end and the foremost screw is driven from the front end.

Another object of the invention is to provide such a conveyor system in which the screws are held in axial alignment by a floating cylindrical dowel pin.

Still another object of the invention is to provide such a system in which the fuel delivered at the forward end of the trough is by-passed laterally and forwardly around the drive system for the foremost conveyor screw.

A further object of the invention is to provide the foremost screw with a regular finned spiral flight except for an extreme forward end conformation which is reversely spiraled to move the fuel sideways.

I have accomplished the object of my invention by the devices and means set forth in the following specification. My invention is clearly defined and pointed out in the appended claims.

A structure constituting the preferred embodiment of my invention is illustrated in the accompanying drawings, forming a part of this specification, in which:

Fig. 1 is a broken plan view of the conveyor system with portions of the casing broken away.

Fig. 2 is a vertical lengthwise enlarged section through part of the conveyor screws on the line 2—2 of Fig. 1.

Fig. 3 is a broken side elevational view of the substance of Fig. 1, with part of the trough broken away.

Fig. 4 is a vertical cross section through the conveyor system, on the line 4—4 of Fig. 3.

Fig. 5 is a vertical cross section through the conveyor system on the line 5—5 of Fig. 1.

Fig. 6 is a vertical cross section through the conveyor system on the line 6—6 of Fig. 1.

Fig. 7 is a vertical cross section through the conveyor system on the line 7—7 of Fig. 1.

Fig. 8 is a vertical lengthwise section through the forward end of the conveyor, including the forward driving means and the ball conduit, showing the screw conveyors in full.

Fig. 9 is a plan view of the forward end of the foremost conveyor screw with the related trough and by-pass conduit shown in section.

Fig. 10 is a vertical section of the foremost conveyor screw on the line 10—10 of Fig. 9.

Fig. 11 is a vertical section through the foremost conveyor screw on the line 11—11 of Fig. 9.

In the drawings and specification, the same reference numbers refer to the same parts, throughout the several views, and the sections are taken along the section lines looking in the direction of the arrows at the ends thereof.

Figure 12:
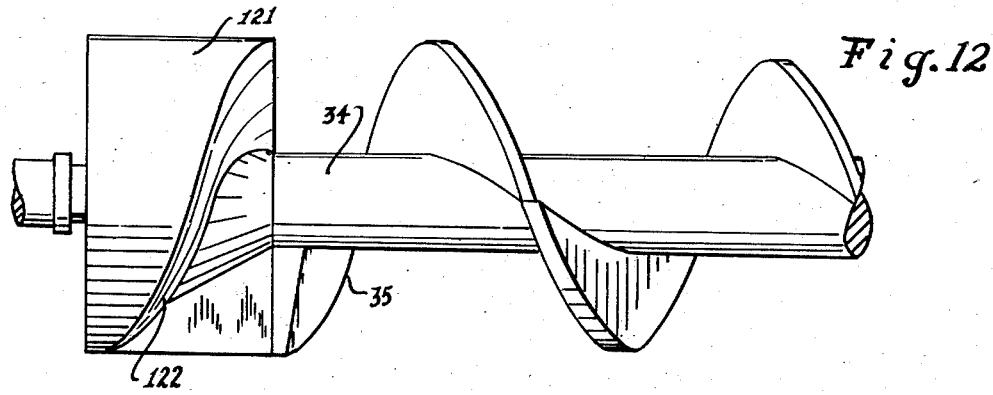
Figs. 12, 13, 14 and 15 show the forward end of the foremost screw in side elevation, at four different angular positions 90° apart.

When referring to fuel, solid fuel such as coal is primarily meant although other solid fuels may be used with the apparatus.

Referring, first, to Figs. 1 and 3, I provide a fuel trough, located beneath longitudinal opening 19 in the deck 18 of a tender fuel bin, which comprises sections 20 and 21. Section 20 is provided with side walls 22 and 23 and an end wall 24 to which is secured a fuel crusher plate 25. Section 21, of the trough, is provided with side walls 26 and 27, and end wall 28. The sections are coupled in end to end relation, and in alignment, at a seam 29 to form a continuous path for coal conveyed from the rear wall 28 to the forward wall 24. The forward wall 24 is pierced by a circular aperture leading to a forwardly extending short cylindrical conduit 30, which receives the screw-conveyed fuel.

Rotatably mounted lengthwise in the trough and resting on a forward bearing plate 31 and a central bearing plate 32 is a forward screw conveyor 33 having a shaft 34 with a spiral flight fin 35 extending from the rear end to near the forward end, and a reversely flighted forward end portion which will be more completely described hereinafter. In axial alignment with screw conveyor 33 is a rear screw conveyor 36 having a shaft 37 and a spiral flight fin 38 of approximately the same pitch and direction as that for the forward screw conveyor, except for the foremost part of the forward screw conveyor as mentioned. The forward end of screw conveyor 36 rests on bearing plate 32 and the rear thereof is supported by a drive shaft 39 keyed into an axial hole in the rear end of shaft 37, said shaft 39 having a bearing in the end wall 28 of the trough and extending into a gear casing 40 where it is driven through a gear wheel 41 which is in turn driven by gear wheel 42 through transmission shaft 43, clutch 44, worm gear 75 and engine shaft 76. Gear 50 also is axially coupled to gear 51 in gear housing 52 at the front end of the conduit 30. Gear 51 in turn drives gear 53, also in the gear housing 52, and gear 53 drives shaft 54 having bearing in the wall between the said gear housing and conduit 30. Shaft 54 is fitted into the forward end of the forward screw to drive the screw. The gearing is such that both shaft 34 and shaft 37 are driven in the same direction, that is, a direction so fuel falling through aperture 19 in tender deck 18 will be conveyed toward the crusher plate 25 and into conduit 30.

Fig. 2 is an enlarged showing of the abutting ends of conveyor screws 33 and 36. The rearward end 55 of shaft 34 has an axial bore 56 and the forward end 57 of shaft 37 has an axial bore 58. Connecting the conveyor screw shaft 34 and 37 is a dowel pin 59 extending into the bores 56 and 58 and supported on suitable roller bearings 61, 62, 63 and 64. End thrust plates 65 and 66, spacing collars 67 and 68, and lubricant packing rings 69 and 70 complete the coupling structure between the two shafts. It will be understood that the dowel pin 59 is a floating dowel pin and that conveyor screw 33 can be rotated independently of conveyor screw 36, but that the two screws are always held in axial alignment.

Referring again to Figs. 1 and 3, it will be apparent that the forward screw is always in engagement with the main drive gear 50 driven by engine shaft 76, whereas the rear conveyor screw may be driven or not according to whether clutch 44 is engaged or not, such engagement being controlled by clutch handle 77 which, through a pivot lever connection with yoke 78 shifts the clutch to engaged or disengaged position.

Referring, especially, to Figs. 1, 5 and 7, I provide on the inner side walls 26 and 27 of section 21 of the trough, and extending from the rear wall 28 forwardly and a short distance beyond the seam 29, angle plates 80 and 81 having the respective surfaces 82 and 83 (Fig. 5) bearing against the upper quadrants of the screw conveyor 36 and a portion of the upper quadrants of the rear end of screw conveyor 33, forwardly to the ends 84 (Fig. 1). Ends 84 are therefore forward of the abutting juncture of the ends of the screws which are coupled by the dowel pin 59. The function of these angle plates 80 and 81 is to hold the free ends of the screws, that is, the ends coupled by the dowel pin, against the bearing plate 32, so that the said ends of the screws are prevented from buckling upward while fuel is being conveyed. In order that the plates 80 and 81 will not interfere with the conveying of fuel from the rear of the conveyor system, the edges 85 and 86 (Fig. 5) of the angle plates are spaced laterally apart approximately a distance equal to the pitch of the conveyor screw fins, so that any fuel that could be carried by the screws will be able to fall in between the turns of their fins.

Referring to Figs. 1, 4 and 9, I show more particularly the cylindrical extension conduit 30 at the front end of the fuel trough, which accommodates the forward end of the foremost screw. Referring to Fig. 4, secured to the forward end 24 of trough 20 is a plate 88 having integral therewith a hollow cylindrical conduit extension portion 89, completed by a cap-piece 90, which has a cylindrical contour surface 91, in which the screw 33 rotates. Integral with cylindrical portion 89 is a sidewardly extending conduit portion 92 (see also Fig. 1), of approximately hollow cylindrical section, with the hollow portion 93 acting as a conduit for fuel pushed sidewardly from the cylindrical extension 30, by action of the forward end of screw 33, as will be explained. Plate 88, cylindrical section 89, and the laterally extending section 92 may be cast as one piece of metal which also includes half of the housing for gears 51 and 53. The other half of said forward gear housing and an extension of elbow-like formation of conduit 92 comprises casting 94, having a removable portion 95 for inspection, and which ends in a ball conduit portion 96. Ball portion 96 receives fuel through conduit 93, preferably increasing in diameter, which because of its elbow-like shape, by-passes the drive gear 53 and its associated casing, and delivers the fuel through a forwardly extending aperture 97 into the forwardly and upwardly extending transfer conduit 98 which, at its rear end has a shell-like portion 99 coupled for limited universal motion to ball 96 by means of pins 100 and 101 and shoes 102 and 103. Rotatably mounted in the transfer conduit 98 is a conveyor screw shaft 111 having a spiral flight 110, said shaft 111 being coupled by universal joint 112 to a forwardly extending shaft 113 secured in gear 53. Shaft 113 extends through bearing 114 in an aperture 115 connecting the gear case casting 94 with the ball 96.

In use, the fuel conveyed toward the front of the foremost conveyor 20 is kicked sideward through conduit 93 into the ball 96 and upwardly and forwardly through conduit 98 toward the locomotive fire box.

Figure 13:
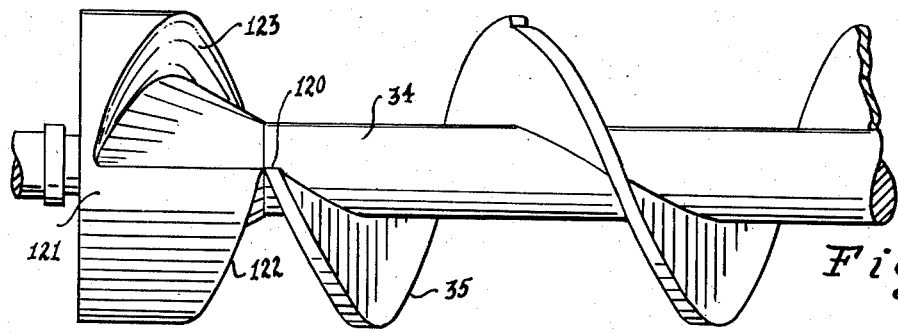
Figure 14:
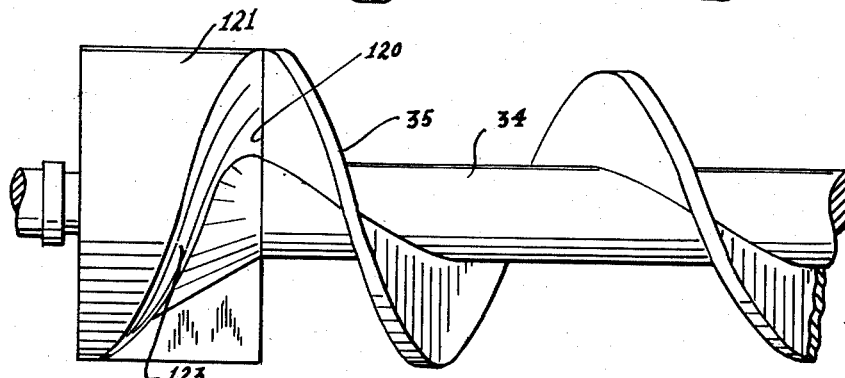
Figure 15:
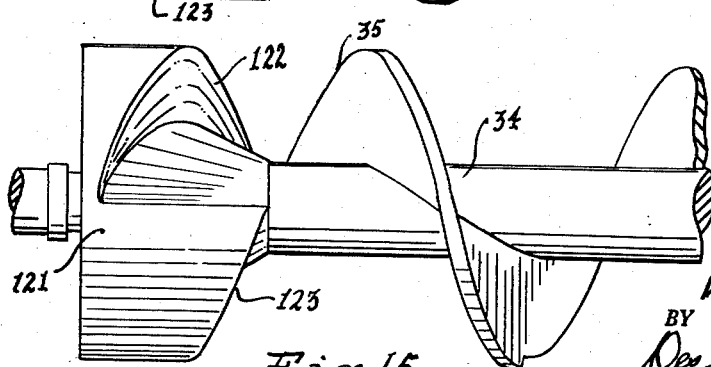

Referring to Figs. 9 and 11–15, the forward end of screw 33 from point 120 (Fig. 9) comprises a cylindrical end piece 121 which has cut on the rear surface thereof two spiral surfaces 122 and 123, each of half a turn, 180° apart, and turning in a sense opposite to the turn of the spiral fin 35. The spiral surfaces taper off to the cylindrical surface at their forward ends, the pitch being about one-third less than that of the spiral fin. It will be seen that the cylindrical section 121, in combination with the spiral surfaces 122 and 123 stops the forward progress of the fuel being conveyed by the screw 33 and, because of the reverse sense of the turning of the spiral surfaces 122 and 123, as compared with the fin 35, the fuel is caused to move laterally into conduit 92, 93 to be therein by-passed around the driving gear 53 into the ball 96 and from there into the forward extending conduit 98. The novel side pushing effect of that portion of the screw 33 comprising cylindrical portion 121 with the spiral surfaces 122 and 123, is important in assuring that the fuel delivered at the forward end of the conveyor system in the tender, will be laterally moved to conduit 93 and around in front of the rotating means for screw 33.

Inasmuch as the elbow-like conduit 93 has its axis in a horizontal plane, no lifting problem is involved in by-passing the coal around the drive gear 53 and its associated housing.

By my construction, I have, therefore, provided an extra long conveyor system, incorporating two screws, one driven at the rear end and the other driven at the forward end, with their abutting ends in axial alignment, and have provided means whereby fuel conveyed along the system is by-passed around the driving means at the front, so that it is available for transport from there to the locomotive fire box.

In operation, either the front screw 33 alone may be rotated by means of the operation of the clutch handle 77 to the position where the drive shaft 43 is disengaged from the engine, or both screws may be rotated by shifting the clutch handle 77 to its engaging position. In practice it is found that the front screw is in operation from two-thirds to three-fourths of the time by itself. The ball and socket arrangement in front of the driving gear 53, enables the proper coupling of the tender conveying system to a locomotive articulated with the tender, so that limited universal motion is possible, without interference with the conveying of fuel toward the locomotive.

I am aware that certain details of construction specified are not necessary to the successful operation of my invention and I do not deem myself limited to the particular construction used, therefore, I claim my invention broadly.

Having thus described my invention, what I claim as new and useful and desire to secure by Letters Patent, is:

1. A fuel conveyor system for a locomotive tender including, in combination, a fuel trough positioned beneath a longitudinal aperture in the floor of the tender having an open side in communication with the longitudinal aperture in the tender floor; a rear screw conveyor rotatably mounted in the rear end of the trough; a front screw conveyor mounted in the front end of the trough in axial alignment with and in end-abutting relation to the rear screw, said rear and front screws being exposed to the longitudinal aperture in the tender floor for receiving the fuel from the tender; drive means located at the rear of the trough for rotating the rear screw; drive means located at the front end of the trough for rotating the front screw; and a side delivery conduit opening into the trough and the front end, for receiving fuel conveyed toward the front end of the trough by the rotation of the screws.

2. A fuel conveyor system for a locomotive tender including, in combination, a fuel trough positioned beneath a longitudinal aperture in the floor of the tender, having an open side in communication with the aperture in the tender floor; said trough having extending forwardly from it a short conduit section; a rear screw conveyor rotatably mounted in the rear end of the trough; a front screw conveyor mounted in the front end of the trough in axial alignment with and in end-abutting relation to the rear screw, said front screw extending into the conduit, and said front and rear screw conveyors being exposed to the longitudinal aperture in the tender floor for receiving fuel; drive means located at the rear of the trough for rotating the rear screw; drive means located at the front of the trough for rotating the front screw, said means being forward of the conduit; and a side delivery conduit opening into the conduit at the front end of the trough, for receiving fuel conveyed toward the front end of the trough and into the conduit by rotation of the screws.

3. A fuel conveyor system for a locomotive tender including, in combination, a fuel trough positioned beneath a longitudinal aperture in the floor of the tender, said trough having at its forward end a conduit extension; a rear screw conveyor rotatably mounted in the rear end of the trough; a front screw conveyor mounted in the front end of the trough in axial alignment with and in end-abutting relation to the rear screw, said front screw extending into the conduit, and said front screw having at its forward end, in the portion extending into the conduit, a reversal of its normal flight for a turn; drive means located at the rear of the trough for rotating the rear screw; drive means located in front of the conduit, at the front end of the trough, for rotating the front screw; a side delivery conduit opening into the conduit at the front end of the trough, for receiving fuel conveyed toward the front of the trough by rotation of the screws, whereby fuel conveyed to the front end of the trough and into the conduit is delivered sideways into the side delivery conduit, and means whereby the forward screw may be driven and the rear screw not driven.

4. A fuel conveyor system for a locomotive tender including, in combination, a coal trough positioned beneath a longitudinal aperture in the floor of the tender; a rear screw conveyor rotatably mounted in the rear end of the trough; a front screw conveyor mounted in the front end of the trough in axial alignment with and in end-abutting relation to the rear screw; a floating dowel pin extending across and into the abutting ends of the screws, said dowel pin being cylindrical and in axial alignment with the axis of the screws, so that the screws may be rotated individually or together, but held in axial alignment; means located at the rear of the trough for rotating the rear screws; means located at the front of the trough for rotating the front screw; and a side delivery conduit opening into the trough at the front end for receiving coal conveyed toward the front of the trough by rotation of the screws or either of them.

5. The combination of claim 2 in which the screws are held in axial alignment but freely rotatable with respect to each other, said means comprising a cylindrical dowel pin extending into cylindrical openings in the ends of the screws that are in abutment.

6. The combination of claim 3 wherein the screws are held in axial alignment by means of a cylindrical dowel pin floating in the abutting ends of screws, in cylindrical apertures therein, and in axial alignment with said screws, whereby the screws may be individually rotated.

7. A fuel conveyor system for a locomotive tender including, in combination, a fuel trough positioned beneath a longitudinal aperture in the floor of the tender; having an open side in communication with the longitudinal aperture in the tender floor; a rear screw conveyor rotatably mounted in the rear end of the trough, said screw conveyor having a spiral flight thereon; a front screw conveyor mounted in the front end of the trough in axial alignment with and in end-abutting relation to the rear screw, the said front screw having a spiral flight thereon of the same pitch and direction as the rear screw except for the front end thereof which has a reversely turned flight portion, and the front and rear screw conveyors being exposed to the longitudinal aperture in the tender floor for receiving fuel; drive means located at the rear of the trough for rotating the rear screw; drive means located at the front of the trough for rotating the front screw; and a side conduit opening into the trough at the front end thereof opposite the reversely turned portion of the flight, for receiving fuel conveyed toward the front end of the trough by rotation of the screws.

8. The combination of claim 7 where that portion of the front end of the screw having the reverse turn of the flight thereon is located in a forwardly extending conduit section of the trough and wherein the side delivery conduit enters into said forwardly extending conduit.

9. The combination of claim 7 in which the screws are held in axial alignment by means of a floating cylindrical dowel pin entering into the abutting ends of the screws in cylindrical openings therein.

10. The combination of claim 1 in which the sense of rotation of the screws, by the drive means, is the same.

11. The combination of claim 2 wherein the sense of rotation of the screws, by the drive means, is the same.

12. The combination of claim 7 wherein the sense of rotation of the screws, by the drive means, is the same.

13. The combination of claim 1 in which the forward screw may be driven and the rear screw not driven.

14. The combination of claim 2 in which the forward screw may be driven and the rear screw not driven.

15. The combination of claim 7 in which the forward screw may be driven and the rear screw not driven.

16. A fuel conveyor system for a locomotive tender including, in combination, a fuel trough positioned beneath a longitudinal aperture in the floor of the tender; a rear screw conveyor rotatably mounted in the rear end of the trough; a front screw conveyor mounted in the front end of the trough in axial alignment with and in end-abutting relation to the rear screw; drive means located at the rear of the trough for rotating the rear screws; drive means located at the front end of the trough for rotating the front screw; and two retaining members, one fastened to each side wall of the trough and extending along the associated top quadrant of the rear screw and a portion of the rear end of the front screw, said members being in abutting contact with the edges of the spiral flights on said screws, and said members being spaced apart transversely of the trough so as to leave a longitudinal opening over the screws lengthwise thereof and of a width approximately equal to the distance between the turns of the flights on said screws.

17. The combination of claim 16 in which the trough has a bearing plate beneath the abutting joint of the screws, said bearing plate being of concave cylindrical contour to support the screw ends where they abut.

18. A fuel conveyor system for a locomotive including, in combination, a fuel trough extending lengthwise beneath a longitudinal aperture in the floor of the fuel bin of the tender, said trough opening upwardly toward the aperture and said trough having a cylindrical conduit section extending forwardly from the front end thereof; a rear conveyor screw rotatably mounted in the rear portion of the trough, said screw having a spiral flight thereon to convey fuel toward the front of the trough when the screw is rotated in a fuel-conveying direction; a forward conveyor screw rotatably mounted in the forward portion of the trough and extending into the forwardly extending conduit section, said screw having a spiral flight thereon to convey fuel toward the front end of the trough and into the forwardly extending conduit section, and said front and rear screw conveyors being exposed to the longitudinal aperture in the tender floor for receiving coal; drive means at the rear of the trough to rotate the rear conveyor screw in a fuel conveying direction; drive means in front of the forwardly extending conduit to rotate the forward screw in a fuel-conveying direction; an elbow-shaped conduit having one end opening into the side of the forwardly extending conduit and extending laterally around the drive means for the forward screw and ending in front of said drive means in a hollow spherical portion forming a ball conduit having an opening facing forwardly; and a spherical shell conduit portion fitting over the ball conduit portion and coupled thereto for limited universal movement, said spherical portion having a forwardly extending straight conduit opening therefrom, whereby, on rotation of the screws, fuel falling in the trough is conveyed through said elbow-shaped conduit, ball, and shell into the conduit extending from the shell.

19. The combination of claim 18 in which the adjacent ends of the screws are in end-abutting relation.

20. The combination of claim 18 in which the adjacent ends of the screws are in end-abutting relation and coupled by a floating cylindrical dowel pin.

21. The combination of claim 18 in which the drive means for the screws are actuated by an engine common to both and in which the driving means for the rear screw may be uncoupled from the engine when desired.

22. The combination of claim 18 in which the ends of the screws are in end-abutting relation and coupled by a floating cylindrical dowel pin, and in which the side walls of the trough over the abutting screw ends are provided with retaining members having surfaces bearing against the upper quadrants of the screws to hold them in the trough, there being a space between said retaining members to permit fuel to fall between them and in between the turns of the screw flights.

23. The combination of claim 18 in which the screw flights of both screws turn in the same direction.

24. The combination of claim 18 in which the forward end of the trough is provided with a fuel crusher plate.

25. The combination of claim 18 in which the straight conduit extending forwardly from the spherical shell is provided with a spiral flighted screw conveyor rotatably mounted therein.

26. The combination of claim 18 in which the straight conduit extending forwardly from the spherical shell is provided with a spiral flighted screw conveyor rotatably mounted therein and driven in a fuel conveying sense by the drive means for the forward screw.

27. The combination of claim 18 in which the forward end of the forward screw, which is opposite the laterally extending opening of the elbow-shaped conduit, is provided with a double spiral surface winding in the opposite direction from the adjacent spiral flight.

28. The combination of claim 27 in which the double spiral surfaces run out to form a cylindrical end to the screw.

29. The combination of claim 27 in which the double spiral surfaces run out after one half turn to form a cylindrical end to the screw.

30. The combination of claim 27 in which the double spiral surfaces are 180° apart.

31. In a fuel conveyor system a trough having a conduit-like fuel delivery end with a side opening therein; a spiral flighted conveyor screw rotatably mounted in the trough and extending into the conduit-like portion, said screw having a fin type of spiral flight from the rear thereof forwardly and ending in the conduit-like portion at the side opening, and having therebeyond, opposite the side opening, a continuation having spiral surfaces formed in a cylindrical end section, said spiral surfaces being two in number, one hundred eighty degrees apart, running out to the cylindrical surface after half a turn, and turning in the opposite sense to the fin spiral flight, whereby fuel conveyed to the delivery end of the trough and into the conduit-like portion, by the rotation of the screw, is given a side movement and pushed through the side opening by said spiral surfaces.

32. The combination of claim 31 in which one of the double spiral surfaces begins at the end of the thrust surface of the fin portion of the screw.

33. A conveyor screw for use in a fuel trough of a stoker device comprising a shaft ending in a large portion of cylindrical section, and said shaft having a spiral fin flight wound therearound and ending at the commencement of the cylindrical section, the thrust surface of the fin ending in continuous relation with a reversely turning spiral surface, commencing at said ending, said spiral surface being carved out of the cylindrical portion.

34. The structure of claim 33 in which the spiral surface runs out to the cylindrical surface after half a turn.

35. The structure of claim 33 in which a second spiral surface is carved in said cylindrical section 180° from the spiral surface which meets the fin.

36. In a fuel conveying system for a locomotive tender having a fuel bin provided with a longitudinal opening in the deck thereof, the combination of a fuel trough disposed lengthwise beneath said opening; a rotatable screw conveyor mounted in the rear portion of said trough; a rotatable screw conveyor mounted in the fore portion of said trough aligned and disposed so as to be in effect a continuation of said other conveyor; driving means rearward of said trough for rotating the first mentioned conveyor; driving means forward of said trough for rotating the second mentioned conveyor; a power transmission device operatively connected with the forward driving means; and coupling means to accomplish connecting and disconnecting of said transmission device with the rearward driving means.

37. In a fuel conveying system for a locomotive tender having a fuel bin provided with a longitudinal opening in the deck thereof, the combination of a fuel trough disposed lengthwise beneath said opening; a rotatable screw conveyor mounted in the rear portion of said trough; a rotatable screw conveyor mounted in the fore portion of said trough and disposed so as to be in effect a continuation of said other conveyor screw; driving means operatively engaged with the first mentioned conveyor screw at its rear end; driving means comprising a shaft having one end operatively engaged with the second mentioned conveyor screw at its fore end; a transfer conveyor screw arranged with its receiving end coupled to the other end of said shaft; conduit-like means disposed so as to receive fuel from the fore end of said second mentioned conveyor and deliver said fuel to the receiving end of said transfer conveyor; a power transmission device for actuating said second mentioned driving means; and clutch-like means for engaging and disengaging said transmission device with said first mentioned driving means.

WILLIAM T. HANNA.

REFERENCES CITED

The following references are of record in the file of this patent:

UNITED STATES PATENTS

| Number | Name | Date |
|---|---|---|
| 1,098,873 | Allen | June 2, 1914 |
| 1,371,497 | Lower | Mar. 15, 1921 |
| 2,007,095 | Myers | July 2, 1935 |
| 2,013,467 | Ketchpel | Sept. 3, 1935 |
| 2,074,303 | Surdy | Mar. 16, 1937 |
| 2,189,074 | Lippert | Feb. 6, 1940 |
| 2,262,580 | Frankland | Nov. 11, 1941 |
| 2,271,939 | Hanna | Feb. 3, 1942 |
| 2,418,540 | Bressler | Apr. 8, 1947 |
| 2,499,929 | Nelson et al. | Mar. 7, 1950 |